United States Patent [19] [11] 4,022,400
Rotter et al. [45] May 10, 1977

[54] TAPE THREADING APPARATUS

[75] Inventors: Gerhard Rotter, Mission Viejo;
Donald L. Burdorf, Newport Beach;
Harold E. Arns, Chino, all of Calif.

[73] Assignee: BASF Aktiengesellschaft,
Ludwigshafen (Rhine), Germany

[22] Filed: Aug. 19, 1974

[21] Appl. No.: 498,446

[52] U.S. Cl. .............................. 242/192; 242/195
[51] Int. Cl.² .................. G11B 15/32; G11B 15/66
[58] Field of Search ................ 242/192, 210, 67.5,
242/195

[56] References Cited
UNITED STATES PATENTS

| | | | |
|---|---|---|---|
| 3,408,016 | 10/1968 | Ganske et al. | 242/192 |
| 3,487,175 | 12/1969 | Newell | 242/192 |
| 3,489,369 | 1/1970 | Ganske et al. | 242/192 |
| 3,750,976 | 8/1973 | Bundschuh et al. | 242/192 |
| 3,773,276 | 11/1973 | Ganske | 242/192 |

Primary Examiner—George F. Mautz
Attorney, Agent, or Firm—Johnston, Keil, Thompson & Shurtleff

[57] ABSTRACT

An apparatus for automatically threading a supply reel of magnetic recording tape equipped with a self starting leader into a tape transport mechanism of the type in which take-up and supply reels are simultaneously driven by surface engagement of a capstan with the outermost tape layer on each reel.

12 Claims, 6 Drawing Figures

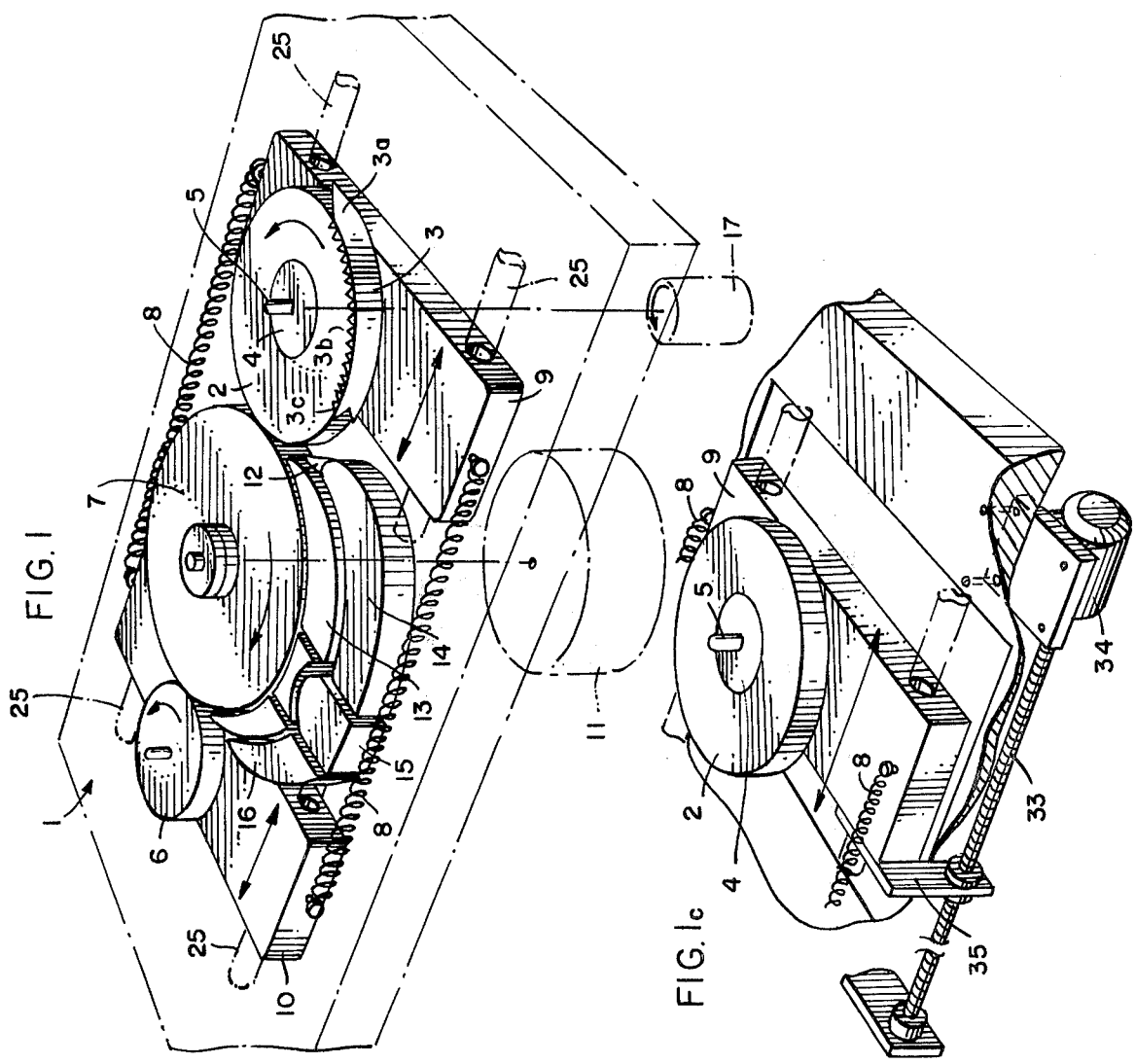
FIG. 1
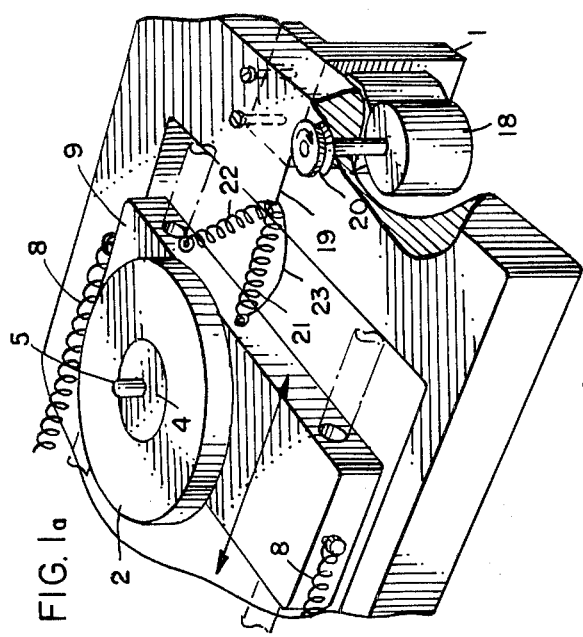
FIG. 1a
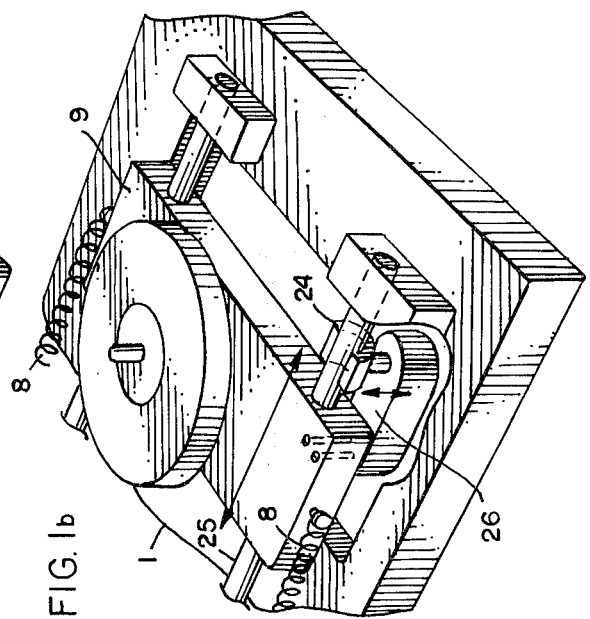
FIG. 1b
FIG. 1c

TAPE THREADING APPARATUS

BACKGROUND OF THE INVENTION

This invention relates to the automatic threading of tape into a tape transport system of the type described, for example, in U.S. Pat. No. 3,370,803. In such systems two tape packs are wound on and unwound from hubs on shafts which are rotatably mounted on carriages. The carriages are slideable toward and away from the capstan as the diameter of the supply tape pack decreases and that of the take-up pack increases, these two carriages being urged toward and the tape packs being driven by the capstan. The supply reel must be equipped with a self threading leader of the type described, for example, in U.S. Pat. No. 3,773,276. The leader includes a series of pre-formed fingerlike gripping tabs which engage either the side edges of convolutions of a reel of tape to keep it wrapped, or alternatively, the outer periphery of a take-up hub to start the leader winding around said hub.

The procedure for threading the tape with such a leader into the tape transport unit requires several steps, including (1) assuring that the leader is properly seated on the supply reel, (2) peeling the leader off the supply reel, (3) feeding the leader through the tape guides past the recording head, (4) starting to wind the leader around the take-up hub, and (5) removing the slack from the system. In terms of convenience it is desirable to have as many of these operations performed automatically as possible. The present invention performs all of the above threading operations not only automatically in the sequence indicated but also quickly and reliably.

OBJECTS OF THE INVENTION

An object of the present invention is to provide an apparatus and a method for automatically threading magnetic recording tape which has been loaded into a tape transport unit of the type taught in U.S. Pat. No. 3,340,803.

A further objective of this invention is to provide an apparatus and method for quickly and reliably threading the above described tape transport unit.

Other objects, features and advantages of the invention will be readily apparent from the description of the preferred embodiments thereof, taken in conjunction with the accompanying drawings.

THE DRAWINGS

FIG. 1 is a perspective view of a tape transport unit equipped with the components of the tape threading apparatus.

FIG. 1a is a perspective view of one embodiment of a slack removal mechanism.

FIG. 1b is a perspective view of a second embodiment of a slack removal mechanism.

FIG. 1c is a perspective view of a combination loading-slack removal mechanism.

BRIEF DESCRIPTION OF THE INVENTION

Figure 2:
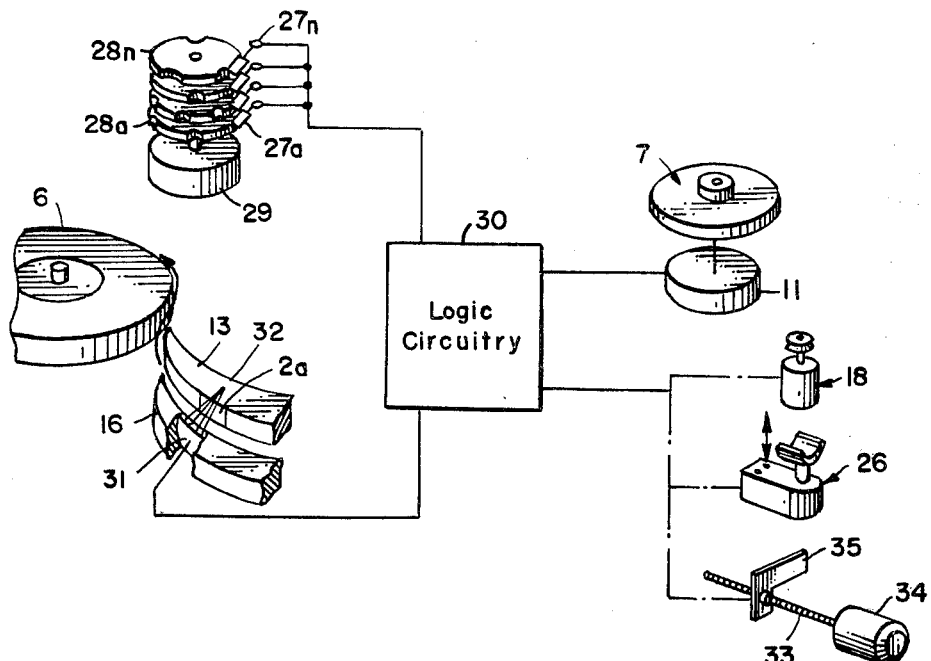
FIG. 2 is a block diagram showing the electrical system of the tape threading apparatus.

The method used to thread tape with a self starting leader after the supply reel has been loaded onto the supply shaft and advanced to contact the capstan is first to seat the leader properly onto the outermost convolutions of the tape pack by driving the supply reel backward. After this is done, driving the supply reel forward enables the tab at the beginning of the leader to be peeled off and the leader pushed through the guides to be wound onto the take-up hub. One of the three alternative methods then removes the slack from the system by holding the supply reel away from the capstan and allowing the take-up reel to pull out the slack.

A series of cam actuated switches for timing in conjunction with electronic logic circuitry controlling the capstan drive and slack removal system are used to accomplish the above-described threading operations. A detailed discussion of the method and apparatus used in this invention follows.

DETAILED DESCRIPTION OF THE INVENTION

FIG. 1 is a pictorial view showing the tape threading apparatus in conjunction with the tape transport unit 1. Supply reel 2, having a leader 3 of the type described in U.S. Pat. No. 3,773,276 is wound on supply hub 4 which is shown snapped onto supply shaft 5. Both the supply reel 2 and the take-up hub 6 are urged against capstan 7 by springs 8 acting on moveable supply and take-up carriages 9 and 10, respectively. An apparatus for loading a supply reel of tape into a tape transport unit of this type is described in detail in pending U.S. application Ser. No. 498,036 filed Aug. 16, 1974, and assigned to the assignee of the present application, now U.S. Pat. No. 3,980,253, the disclosure of which is incorporated herein by reference.

It is first necessary to seat leader 3 properly onto supply reel 2, as a leader loosened from handling might otherwise cause improper threading. The seating is accomplished by energizing drive motor 11 to drive capstan 7 counterclockwise. The capstan in turn drives supply reel 2 clockwise thereby "ironing" leader 3 onto the outermost convolutions of supply reel 2. The surface speed at which this operation is performed is only a fraction of the normal operating speed.

Following the leader-seating operation, the drive motor 11 reverses directions and begins driving supply reel 2 counterclockwise, again at reduced speed, to cause tab 3a of leader 3, which extends tangentially from supply reel 2 due to the absence of any fingers 3b at this leading edge, to be peeled off by peeling means 12 and directed by guides 13 and 14 past recording head 15 and by guides 13 and 16 to the interface between take-up hub 6 and capstan 7 to begin wrapping around hub 6.

The design of leader 3 must be such that it meets two criteria. First, due to the principle upon which the self-starting leader operates, the portion of leader 3 with the fingers 3b can be no longer than the circumference of hub 6 in order to allow all of the fingers 3b to properly engage take-up hub 6 without interfering with each other. In addition, since only the more rigid leader and not the very flexible magnetic tape itself can be pushed through the guides 13, 14 and 16, the leader must be long enough to allow its leading tab 3a to be caught by take-up hub 6 and capstan 7 while its trailing edge 3c is still being driven at the interface between capstan 7 and supply reel 2.

After the leader 3 has begun to wrap around take-up hub 6 there is necessarily some slack in the leader and beginning of the tape between supply reel 2 and hub 6 due to pushing the leader through guides 13, 14 and 16.

Either of three alternative methods developed to remove the slack can be used. All utilize brake 17 acting on supply shaft 4 resisting counterclockwise rotation. The braking mechanism is described in detail in pending U.S. application Ser. No. 388,929, filed Aug. 16, 1973, now U.S. Pat. No. 3,921,933 and assigned to the assignee of the present application the disclosure of which is incorporated herein by reference. One embodiment involves a motor 18 which tends to pull carriage 9, and therefore supply reel 2, away from capstan 7 against the forces of springs 8. FIG. 1a shows the details of this slack removal system. One end of cable 19 is wound around and attached to pulley 20 which is mounted on the shaft of motor 18. The other end of cable 19 is connected to spring 21, the other end of which is attached to carriage 9. The length of cable 19 is such that spring 21 is relaxed when supply reel 2 is depleted and motor 18 is not energized. The slack resulting with a full supply reel 2 is removed by the relatively weak spring 22. The energization of motor 18 will cause cable 19 to be wrapped around pulley 20 with the rate of wrap decreasing as the motor 18 is decelerated and ultimately stopped due to the force of spring 21 and restraint cable 23 which allows only a limited degree of stretch in spring 21. As long as the motor 18 remains energized it continues to exert a force on carriage 9 opposing the forces of springs 8. This action reduces the driving by capstan 7 of supply reel 2 by reducing the contact pressure therebetween. With supply reel 2 no longer being as forcefully driven and, furthermore, being restrained by brake 17, the rotation of take-up hub 6 pulls the leader 3 and tape 2 taut.

The second embodiment for slack removal is shown in FIG. 1b. This system utilizes a clamp 24 to engage rod 25 when solenoid 26 is energized thereby preventing relative movement between supply carriage 9 and tape transport base 1. By locking carriage 9 when a portion of leader 3 is still between the interface of capstan 7 and supply reel 2, a gap equal to the thickness of the leader 3 is established therebetween when the trailing end 3c of the leader passes beyond the interface. The existence of this gap reduces or eliminates the driving by capstan 7 of supply reel 2 and, as in the first embodiment, allows the slack to be removed. Once the slack has been removed, deenergization of solenoid 26 permits springs 8 to resume the normal contact pressure between capstan 7 and supply reel 2.

The third embodiment for slack removal is shown in FIG. 1c. An advantage of this embodiment is that it uses a motor and lead screw which may also be used in the loading of the tape transport unit. See above-referenced U.S. Pat. No. 3,980,253.

Rotation of lead screw 33 by bidirectional motor 34 causes threaded bracket 35 to translate. Bracket 35 is shown in contact with carriage 9 but it should be understood there is no connection therebetween. Driving bracket 35 to the right (as shown in FIG. 1c) results in retraction of carriage 9 away from capstan 7 against the forces of springs 8. Driving bracket 35 to the left results in advancement of carriage toward capstan 7 under the forces of springs 8 until supply reel 2 contact capstan 7. After such contact is made further driving of bracket 35 to the left will result in its movement away from carriage 9, which is restricted from further advancement due to the contact between supply reel 2 and capstan 7. To remove slack after the leader has begun wrapping around take-up hub 6, motor 34 is energized for a short time to reduce or eliminate the driving by capstan 7 of supply reel 2. As explained above, this action allows driven take-up hub 6 to pull the leader 3 and tape 2 taut.

Now having removed the slack by one of the three alternative methods, the threading is completed by running a length of tape through the tape transport system at normal playing speed to begin the take-up tape pack on hub 6.

The sequencing of the various operations discussed above is controlled in the preferred embodiment of the invention by an electromechanical and electronic system, a diagram of which is shown in FIG. 2. Generally, the control system comprises a means to establish the basic timing, a means to sense the progress of the leader and tape through the tape transport system, and logic circuitry to control the capstan drive motor 11 and whichever embodiment of the slack removal system which is used.

The timing is established in this embodiment of the invention by means of binary signals generated by switches 27a to 27n which are actuated by cams 28a to 28n driven by motor 29 which rotates no more than once in the period allotted for threading so that the entire threading sequence can be programmed on the circumference of the cams. The binary signals generated by energizing motor 29 through one revolution are fed into logic circuitry 30.

Another binary input to logic circuitry 30 is supplied by photosensor 31 which is responsive to light emitted from light source 32. As shown in FIG. 2, photosensor 31 and light source 32 are located in guides 16 and 13, respectively, on opposite sides of the tape path. This arrangement permits, by the use of either a transparent or an opaque leader in conjunction with opaque recording tape, the sensing of either the leader-tape junction or the leader tab 3a, respectively. In addition, by removing the opaque magnetic recording medium from the transparent tape base at a particular location on the tape, a signal will be generated when that washout (not shown) passes between the photosensor 31 and the light source 32. Such signals are fed into the logic circuitry 30 to aid in the sequencing of the various threading operations as explained below.

The logic circuitry 30 consists of conventional AND, OR, NAND, and NOR gates and FLIP-FLOPS to accomplish the various control functions.

The drive motor 11 is such that, upon receipt of appropriate signals from the logic circuitry 30, it can drive the capstan 7 in at least four operating modes: slow or normal operating speed clockwise and slow or normal operating speed counterclockwise. The surface speed of the capstan 7 corresponding to these operating modes will naturally vary depending on the application. In one application involving the recording of video signals, capstan surface speeds of 15 inches per second and 120 inches per second for the slow and normal operating speeds, respectively, proved successful.

Figure 3:
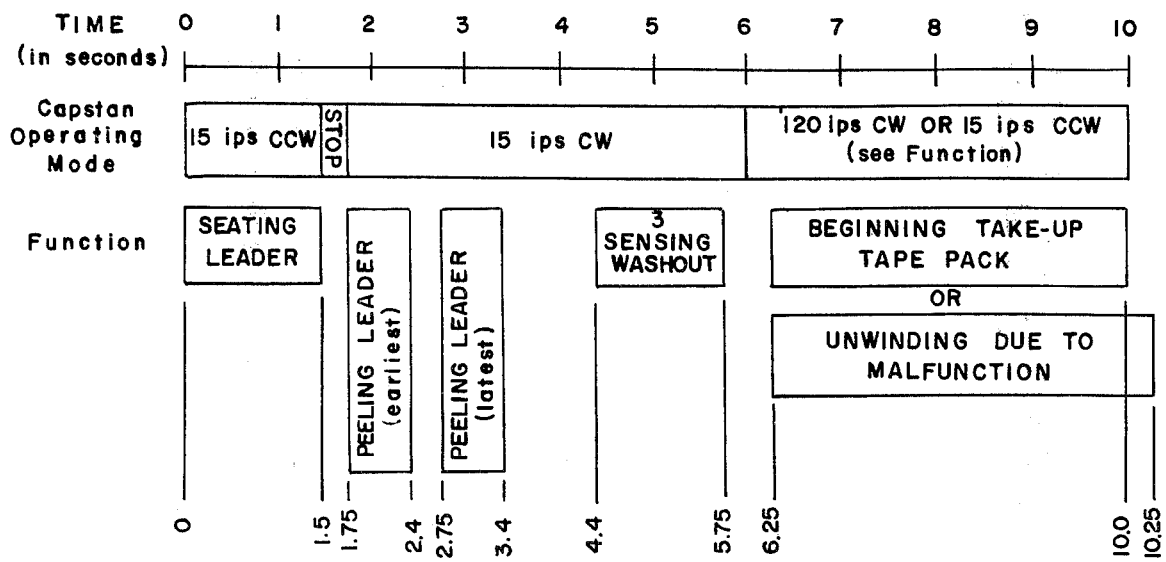
FIG. 3 shows the sequence and duration of the several threading operations.

FIG. 3 indicates the timing scheme used in this embodiment of the invention. The precise timing is not fundamental to the invention, as it will vary depending on the particular configuration of the tape transport unit, its operating characteristics, the nature of the tape used, etc. The numbers used in the following discussion are based on a tape transport system having a capstan 7 approximately 3 inches in diameter, a full supply reel approximately 5 inches in diameter, a take-up hub 6 approximately 2 inches in diameter with the slow and normal operating speeds being 15 and 120 inches per second, respectively, and the entire threading operation being completed in 10 seconds.

As indicated in FIG. 3, the capstan 7 is first driven counterclockwise (as viewed from above) at the slow speed for a period of time sufficient to properly seat leader 3 onto the outer convolutions of supply reel 2. Then, following a short pause the capstan 7 is driven clockwise at the slow speed. Several operations take place while the capstan 7 is being driven in this operating mode. First, tab 3a of leader 3 is peeled off supply reel 2 by peeling means 12. The exact time at which the peeling off will occur cannot be precisely determined because of the uncertainty as to where tab 3a will be in relation to peeling means 12 when capstan 7 begins to rotate clockwise. After being peeled off, leader 3 will be pushed through guides 13, 14 and 16 and caught between capstan 7 and take-up hub 6. Once the leader 3 is caught the slack must be removed. A further timing criterion is that the tape itself should be under the increased tension before it passes the interface between capstan 7 and take-up hub 6 to assure proper centering of the beginning of the tape on the periphery of the take-up hub. The fingers 3b assure that the leader is properly centered. If either motor 18 or motor 34 is used to remove the slack (see FIGS. 1a and 1c) the use of a transparent leader generates a properly timed signal to actuate the motor as the leader-tape junction passes between the photosensor 31 and the light source 32. A signal from the logic circuitry 30 continues to energize the motor long enough for the first several convolutions of tape 2 to be wound onto take-up hub 6 thereby assuring that the beginning of the tape pack is tightly wound and all slack is removed. If a carriage lock 24 (see FIG. 1b) is used, solenoid 26 must be energized before the leader-tape junction passes beyond the interface between capstan 7 and supply reel 2 in order to leave the gap (explained above) when the leader is completely unwound from supply reel 2. The use of an opaque leader generates a properly timed signal when the beginning of the leader passes between photosensor 31 and light source 32. This signal causes logic circuitry 30 to energize solenoid 26 until enough time passes for the first several convolutions of tape 2 to be wound onto take-up hub 6.

Next, in a preferred embodiment of the invention a washout (explained above) is used to assure that the threading operations have been performed properly. The washout is located a sufficient distance from the beginning of the tape to assure that it will pass between the photosensor 31 and the light source 32 only if the threading has been successfully completed. Furthermore, from the surface speed of the capstan 7 and the geometry of the tape transport system 1, the time period during which the washout will pass the photosensor 31 is predictable. In this preferred embodiment, the logic circuitry 30 is such that unless the signal from the photosensor 31 is received in the predetermined interval the signal to the drive motor 11 to drive the capstan at the normal operating speed will not follow. Instead, the entire system will come to a stop and permit only an unwind (slow counterclockwise) signal to be given to the drive motor 11. If the signal from the photosensor 31 is received within the proper interval, the logic circuitry 30 will cause the motor 11 to be driven for about 4 seconds at normal operating speed to begin the take-up tape pack. The tape transport system 1 is then loaded and ready for recording and/or reproduction of intelligence onto or off from the tape. While the apparatus herein described constitutes a preferred embodiment of the invention, it is to be understood that the invention is not limited to this precise form of apparatus, and that changes may be made therein without departing from the scope of the invention.

We claim:

1. An apparatus for automatically threading a supply reel of tape having a self-starting leader into a tape transport mechanism of the type in which the rotatable supply reel and take-up hub are movable relative to and urged towards the capstan in order to be simultaneously driven through surface engagement of the outer periphery of said reel and hub with the outer periphery of said capstan, said apparatus comprising:

a peeling means to peel said leader from said supply reel;

guide means to direct said leader through the tape path between said leader and said hub;

a means to selectively rotate said capstan in at least one mode in a first sense of rotation and in at least one mode in a second sense of rotation;

a means for reducing or eliminating the contact pressure between said supply reel and said capstan; and automatic sequencing means, including at least timing means and tape detecting means, and connected to said capstan-rotating means and said contact pressure reducing means over first and second circuit connections, respectively;

said automatic sequencing means, under the control of said timing means, being effective to control said capstan-rotating means over said first circuit connections through a threading cycle comprising a plurality of phases during a first of which phases said capstan-rotating means is operated in said second sense to drive said supply reel in a direction opposite to the playing direction, thereby to secure said self-starting leader onto the outermost convolutions of said supply reel of tape, and during a second of which phases said capstan-rotating means is operated in said first sense to drive said supply reel in the playing direction, thereby to cause said peeling means to peel said leader off said supply reel and push said leader through said guide means so as to at least cause the leading end of said leader to be captured between said take-up hub and said capstan; and said automatic sequencing means, in response to a change of condition of said tape detecting means when said tape has advanced to a certain position, causing said contact pressure reducing means to be activated over said second circuit connections, during a predetermined portion of said second phase, to permit the take-up hub to remove the slack in the tape resulting from said pushing of the leader.

2. An apparatus as set forth in claim 1 wherein said automatic sequencing means comprises electrical logic circuitry, in addition to said timing means and tape detecting means, said logic circuitry being jointly controlled by said timing means and said tape detecting means to control said capstan-rotating means and said contact pressure reducing means over said first and second circuit connections, respectively; and wherein in another position of said tape there are provided on said tape predetermined markings;

said logic circuitry under the control of said timing means being effective to control said capstan-rotating means through said two phases in said second sense and said first sense, respectively, to cause rotation of said capstan at a speed substantially lower than the normal forward and reverse operating speed; and said logic circuitry being effective, under the control of said tape detecting means, if, as an indication of the successful completion of said threading operation, said markings have been detected within a predetermined time, to increase the speed of rotation of said capstan-rotating means in said first sense to said normal speed.

3. An apparatus as set forth in claim 2 wherein said automatic sequencing means is effective, under the control of said tape detecting means, if, as an indication that the threading operation has not been successfully completed, said markings have not been detected within said predetermined time, to prevent the further rotation of said capstan-rotating means in said first sense.

4. An apparatus as set forth in claim 1 wherein said timing means comprise switch means and actuator means for opening and closing said switch means according to a predetermined program, said opening and closing producing pulsed electrical signals impressed on said logic circuitry.

5. An apparatus as set forth in claim 4 wherein said actuator means comprise at least one substantially circular cam the periphery of which is contoured to open and close said switch means according to said predetermined program upon rotation; and means to rotate said cam no more than once during the course of threading said tape into said tape transport mechanism.

6. An apparatus as set forth in claim 2 wherein said tape detecting means comprise:
 a light sensing means generating a distinctive electrical signal when impinged upon by light of a given intensity; and
 a light source admitting light of said intensity, said light sensing means and said light source being situated such that light from said light source must pass through the path of properly threaded tape in order to impinge upon said light sensing means,
 whereby said distinctive electrical signal is generated when the segment of either said leader or said tape between said light sensing means and said light source is transparent.

7. An apparatus as set forth in claim 1 wherein said reel and said hub each is rotatably mounted on relatively movable support means; wherein resilient means are provided which urge said support means toward said capstan; and wherein said contact pressure reducing means comprise motor means and force transmitting means between said motor means and said support means such that actuation of said motor means for a predetermined time tends to momentarily exert a pull on the support means of said supply reel, and hence on said reel itself, away from said capstan against the action of said resilient means, thereby to cause said slack to be removed.

8. An apparatus as set forth in claim 7 wherein said force transmitting means include a pulley driven by said motor means and also a cable and a spring, one end of said cable being attached, through the medium of said spring, to the support means of said supply reel and the other end of said cable being attached to said pulley.

9. An apparatus as set forth in claim 7 wherein said motor means is of the reversible type; and wherein said force transmitting means include a lead screw driven about its axis by said motor means, and a bracket threaded into said lead screw for bidirectional translational movement thereon; the support means of said supply reel being engagable by said bracket such that actuation of said motor means in a given direction for a predetermined time tends to exert said momentary pull on said supply reel.

10. An apparatus as set forth in claim 1 wherein said reel and said hub each is rotatably mounted on relatively movable support means; wherein resilient means are provided which urge said support means toward such capstan; and wherein said contact pressure reducing means comprise clamping means for preventing said relative movement of said support means, and electromagnetic means operating said clamping means such that actuation of said electromagnetic means beginning at a time when a portion of said leader is still between the interface of said supply reel and said capstan tends to maintain, notwithstanding the action of said resilient means, a gap corresponding to the thickness of the leader between said reel and said capstan when the trailing end of the leader passes beyond said interface, thereby to cause said slack to be removed.

11. A method for automatically threading a supply reel of tape having a self-starting leader into a tape transport mechanism of the type in which the rotatable supply reel and take-up hub are movable relative to and urged towards the capstan in order to be simultaneously driven through surface engagement of the outer periphery of said reel and hub with the outer periphery of said capstan, the steps of said method comprising:
 in a first phase of the threading operation automatically driving said capstan, and hence said supply reel, in a direction opposite to the normal playing direction of said reel to secure said self-starting leader onto the outermost convolutions of said supply reel of tape;
 in a second phase of the threading operation automatically driving said capstan, and hence said supply reel, in the playing direction of said reel to cause said leader to be peeled off said supply reel and pushed in the direction of the interface between said take-up hub and said capstan so that the leading end of said leader is captured between said hub and said capstan before the trailing end of said leader ceases to be driven between said supply reel and said capstan; and
 during said second phase automatically initiating, at a time after the leading end of said leader has begun winding around said take-up hub but before the tape itself has begun so winding, relief of the contact pressure between said supply reel and said capstan while said capstan and hence said supply reel are being rotated in said playing direction, and maintaining said relief for a predetermined portion of said automatic threading operation only, thereby to permit said take-up hub to remove the slack in the tape caused by said pushing action.

12. A method as claimed in claim 11, said method comprising the further steps of
 monitoring the progress of the threading operation, and
 controlling the further operation of the transport mechanism in accordance with the result of said monitoring.

* * * * *